May 19, 1959     W. C. FULPS     2,887,524
MIDSPAN CONNECTION
Filed April 24, 1956
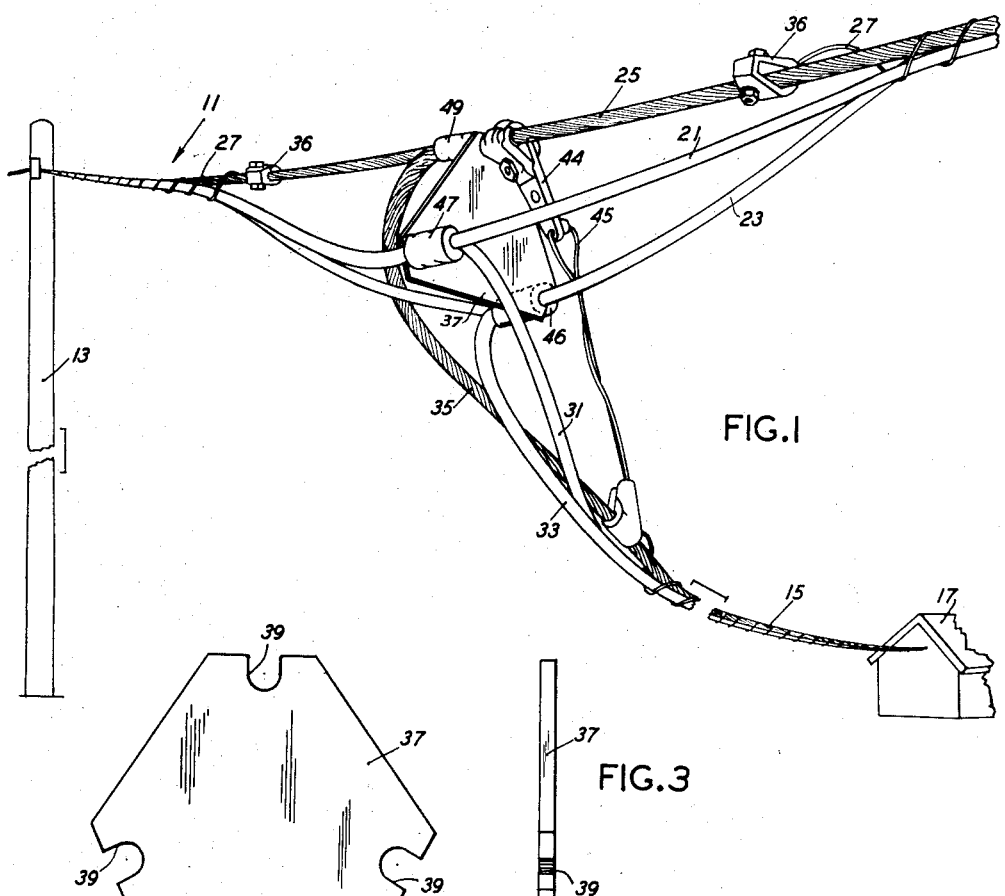
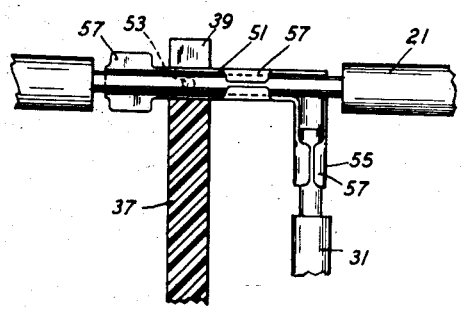
INVENTOR.
WILLIAM C. FULPS
BY
*Buckhorn and Cheatham*
ATTORNEYS

United States Patent Office 2,887,524
Patented May 19, 1959

2,887,524

MIDSPAN CONNECTION

William C. Fulps, Eugene, Oreg.

Application April 24, 1956, Serial No. 580,384

7 Claims. (Cl. 174—43)

This invention relates to a midspan connection for a lashed cable assembly and to a method of forming such a connection.

Lashed cable assemblies, which include two or more secondary cables and a ground cable bound together with a lashing line, have come into recent use. Improvements in the properties of cable insulation have made such assemblies practicable and they are used because they have a much better appearance than conventional spaced cables, because the pole top assemblies are neater, and because midspan service connections can be made to such lashed cable assemblies with the result that shorter service drops and a greater spacing between poles can be employed.

At present, the conventional manner of forming a midspan connection to a lashed cable is to cut away a portion of the lashing line, separate the secondary cables and ground cable at such place, and while maintaining the cables in a spread condition cut away the insulation of the secondary cables and then connect the ends of the service drops to the bare portions of the secondary cables. Thereafter, insulating tape or similar material is wrapped around the connections thus formed to provide an insulating cover so that the connections will remain insulated from one another when the secondary cables and ground cable are released and assume a contiguous relationship.

It is a main object of the present invention to provide a midspan connection assembly which eliminates the necessity of applying insulating tape to the connections between the service drops and the secondary cables, thus to make it possible to make a midspan connection in a fraction of the time heretofore required.

It is a further object of the present invention to provide a novel method of making a midspan connection on a lashed cable assembly which takes less time than heretofore required.

The midspan connection arrangement of the present invention includes a spacer plate of insulating material which is inserted between and permanently mounted on the secondary and ground cables of a lashed assembly when the lashing is cut and the cables spread. Thereafter the secondary cables have portions of the insulation stripped therefrom at said plate and the service drop lines are connected or dead-ended to the bare portions of the secondary cables by metal compression type connectors which may be applied in a matter of seconds. The ground line service drop is similarly connected to the ground cable secondary. Since the spacer plate holds the cables permanently in spaced relation, no taping of the connections is required.

Various other objects of the present invention will be apparent from the following description taken in connection with the accompanying drawings wherein:

Fig. 1 is a perspective view showing a midspan connection of the present invention made between the service drop lines and secondary cables;

Fig. 2 is a plan view of an insulating spacer plate;

Fig. 3 is an edge view of the plate;

Fig. 4 is an enlarged fragmentary view in section through two of the connections between a service drop cable and a secondary cable; and Fig. 5 is a fragmentary view somewhat similar to Fig. 4 but showing a modified form of the invention.

Referring to the accompanying drawings, a lashed cable assembly is indicated generally at 11 supported by poles 13, one of which is shown, the cable assembly 11 being adapted to supply electrical current through a service drop assembly generally indicated at 15 to a dwelling 17.

More in detail, the lashed cable assembly includes a pair of insulated secondary cables 21 and 23 and a bare cable 25 which serves as a ground conductor and as a support for the secondary cables. Wrapped around these cables is a lashing line 27, and prior to the formation of the midspan connection, the lashing line 27 extends in continuous fashion along the length of the cable assembly. The service drop assembly 15 includes two service drop current-carrying lines 31 and 33 and a ground service drop line 35 which serves as the support for the current-carrying lines 31 and 33 and also as a ground conductor.

The construction of the midspan connection is best explained in connection with the method of forming the arrangement. The first step in forming the connection is to cut away a portion of the lashing 27 and secure temporarily the ends to the bare cable in any suitable manner, such as by clamps 36. The cables are then spread apart and a spacer plate 37, which is shown as being of generally triangular form, is forced between the secondary cables and the ground cable. The spacer plate is formed of insulating material and has outwardly facing peripheral notches 39 formed therein snugly accommodating the cables. The amount of lashing removed is such that the plate fits between the cables with the cables in a tensioned condition, thus to hold the plate against accidental dislodgment. It will be appreciated that there is considerable force on the secondary cables urging them into contiguous relation with the ground cable 25 no matter what length of lashing is removed, but the force increases as the amount of lashing removed decreases. Thereafter, a short portion of the insulation of one current-carrying cable, say cable 21, is stripped away to provide a bare cable portion, as best shown in Fig. 4, after which the plate 37 is shoved over so that the bare cable portion fits or rests within the associated notch. Then the other current-carrying cable, 23, is similarly treated with the insulation being cut away in a manner to provide a bare portion which is offset longitudinally of the cables from the bare portion of the cable 21, Fig. 4, but overlapping the same by a distance equal to the thickness of the plate. The plate is then shifted to a position bearing against both bare portions of the cables 21 and 23, in which position, the opposite side walls of the plate at the vincinity of such bare portions bear against the shoulders 41 and 43 of the insulation of cables 21 and 23, respectively.

The ground service drop line 35 is then secured by a clamp connector 44 and link 45, of conventional construction, to the ground cable 25, so that the service drop assembly is now supported from the ground cable 25 of the lashed assembly. Thereafter, the ends of the service drop lines 31 and 33 are stripped to provide bare portions, and these bare portions are connected one to each of the bare portions of the secondary cables 21 and 23 by metal compression sleeve clamps 46 and 47, respectively. These compression sleeve clamps are formed of malleable material, such as soft aluminum, and are generally C-shaped in cross section prior to application to the assembly. They are slipped onto and over the contiguous bare portions of a secondary cable and a service drop end and then clamped in place by suitable heavy clamping pliers. The length of the bare portions provided in cables 21 and 23 is selected so that when the compression clamps are compressed, the axial extension thereof is sufficient to force the spacer plate in tight engagement with the insulation shoulders 41 and 43, thus to secure the spacer plate in place against dislodgment. The service drop ground line 35 is also connected to the bare cable 25 by a compression clamp 49. The connector 44 is then loosened slightly and forced over against the spacer plate to hold the plate against clamp 49. Now, the clamps 36 are removed and the ends of the lashing line 27 are wrapped around the secondary cables in a direction toward the spacer plate to tighten the grip of the cables on the plate. The ends of the lashing line are again secured to the ground cable 25 by clamps 36. When this is done, the midspan connection has been completed, there being no need to wrap the various connections with insulating tape as has heretofore been required because they are permanently disposed in spaced relation by the spacer plate.

Fig. 5 shows a modified form of the invention in which each notch in the spacer plate 37 is equipped with a clamp device 51 which is held in place by a suitable rivet 53. The device 51 is generally semi-circular in cross-section and has a lateral leg 55 which is also generally semi-circular in cross-section. The device is made of malleable metal and is equipped with pairs of tabs or ears 57 along the length of its main portion and along the leg 55. In this form of the invention a secondary cable, which may be assumed to be cable 21, is stripped bare, as shown, and the bare portion laid in the main portion of the member 51. Thereafter the associated tabs 57 are bent over into embracing relationship to hold and connect the spacer plate 37 to the cable. The service drop 31 is connected to the device 25 by placing a bare end of the cable within the leg 55 and bending over the associated tabs 57.

Having described the invention in what is considered to be the preferred embodiment thereof, it is desired that it be understood that the invention is not to be limited other than by the provisions of the following claims.

I claim:

1. A midspan connection comprising a lashed cable assembly including at least two secondary cables and a ground cable bound together by a lashing line, said lashing line being interrupted at a portion of said cable assembly, a spacer plate of insulating material arranged between said cables at said interrupted portion with its plane normal to said cables and holding said cables in spaced relation at such place, a service drop cable assembly including at least two current-carrying service drops and a ground drop, means securing the current-carrying drops one to each of said secondary cables at said spacer plate and securing said ground line to said ground cable at said spacer plate, said securing means including separate devices, one of which is disposed on one side of and against said plate and the others of which are secured on the opposite sides of and against said plate to hold said plate in place.

2. A midspan connection comprising a lashed cable assembly including at least two secondary cables and a ground cable bound together by a lashing line, said lashing line being interrupted at a portion of said cable assembly, a spacer plate of insulating material arranged between said cables at said interrupted portion with its plane normal to said cables and holding said cables in spaced relation at such place, a service drop cable assembly including at least two current-carrying service drops and a ground drop, means securing the current-carrying drops one to each of said secondary cables at said spacer plate and securing said ground line to said ground cable at said spacer plate, said plate having outwardly directed peripheral notches receiving said cables and holding said cables in a predetermined spaced relationship, each notch having a width substantially equal to the diameter of the cable received therein, each cable having a bare portion providing shoulders at the exposed ends of the insulation, at least certain of said shoulders limiting displacement of said plate in a direction lengthwise of said lashed cable assembly.

3. A midspan connection arrangement for a lashed cable assembly which includes at least two secondary cables and a ground cable lashed together and wherein the lashing is interrupted at a predetermined portion thereof, a flat spacer plate of insulating material disposed between said cables and having peripheral contrivances for holding said cables in a predetermined oriented spatial relationship, and a bare metal fastening device associated with each contrivance for securing a corresponding service drop line to the associated cable.

4. A midspan connection comprising a lashed cable assembly including at least two insulated secondary cables and a bare ground cable bound together by a lashing line, said lashing line being interrupted at a portion of said cable assembly, a spacer plate of insulating material arranged between said cables at said interrupted portion with its plane normal to said cables and holding said cables in spaced relation at such place, means for holding said spacer plate against dislodgment from such position, each insulated cable having a bare portion along the spread section thereof, a service drop cable assembly including at least two current-carrying service drops and a ground drop, bare metal means securing the current-carrying drops one to each of said secondary cables at the bare portions of said secondary cables and securing said ground line to said ground cable locally of said spacer plate.

5. A midspan connection comprising a lashed cable assembly to be supported by spaced poles and including at least two insulated secondary cables and a bare ground cable bound together by a lashing line, said lashing line being interrupted at a place between the poles, a spacer plate of insulating material arranged between said cables intermediate the ends of said interrupted portion and providing outwardly directed notches to receive said cables so that said plate may be inserted without having to sever or break a cable, said plate serving to spread said cables apart and said notches being spaced from one another so that each cable is spaced from the remaining cables, means axially spaced from said plate on either side thereof for holding said cables together, the spacing of the last-mentioned means from said plate being proportioned to the size of the plate so that the spread cable portions are urged together thereby to cause the cables to press inwardly within their notches to restrain the cables from becoming dislodged from the notches, a service drop assembly including at least two current-carrying drops and a ground drop, each of the insulated cables having a bare portion along the spread sections of said cables, and bare metal means for each cable, each bare metal means for the insulating cables securing a current-carrying drop to its cable at the bare place thereof, the bare metal means for the ground cable securing the ground drops to the ground cable at the spread section of said ground cable, the bare metal means for said secondary cables being separated from said ground cable by virtue of the spreading of the cables by said plate so that bare metal means need not be wrapped with insulating material.

6. A midspan connection comprising a cable assembly including at least two insulated secondary cables and a bare ground cable bound together by binding means, said binding means being interrupted at a predetermined place, a spacer plate of insulating material arranged between said cables intermediate the ends of said interrupted portion and providing separate means for each cable for receiving the cables, said plate serving to spread said cables apart and said separate means being spaced from one another so that each cable is spaced from the remaining cables, said binding means holding said cables together at places spaced from said plate by distances great enough to enable said plate to be inserted between said cables and yet small enough to cause said cables to tend to remain in engagement with said separate means, a service drop assembly including at least two current-carrying drops and a ground drop, each of the insulated cables having a bare portion along the spread section thereof, and bare metal means for each cable, each bare metal means for the insulated cables securing a current-carrying drop to its cable at the bare place thereof, the bare metal means for the ground cable securing the ground drop to the ground cable at the spread section of said ground cable, the bare metal means for said secondary cable being separated from said ground cable by virtue of the spreading of the cables by said plate so that the bare metal means need not be wrapped with insulating material.

7. A midspan connection comprising a cable assembly including at least two insulated cables and a bare ground cable wrapped together in contiguous relationship, a spacer member of insulating material arranged between said cables and having outwardly directed notches to receive said cables so that said spacer member may be inserted without having to sever or break a cable, said notches being spaced from one another so that each cable is spaced from the remaining cables, the spacing of the notches from one another being sufficient to spread the cables apart at the location of the spacer member an extent substantially exceeding the normal contiguous relationship of the cables to tension the cables to cause the cables to press inwardly within their notches to restrain the cables from becoming dislodged from the notches, a service drop assembly including at least two current-carrying drops and a ground drop, each of the insulated cables having a bare portion along the spread sections of said cables, and bare metal means for each cable, each bare metal means for the insulating cables securing a current-carrying drop to its cable at the bare place thereof, the bare metal means for the ground cable securing the ground drops to the ground cable at the spread section of said ground cable, the bare metal mean for said secondary cables being separated from said ground cable by virtue of the spreading of the cables by said spacer member so that bare metal means need not be wrapped with insulating material.

References Cited in the file of this patent
UNITED STATES PATENTS

| | | |
|---|---|---|
| 1,813,863 | Nightingale | July 7, 1931 |
| 2,165,087 | Alford | July 4, 1939 |
| 2,296,443 | Kleinfelder | Sept. 22, 1942 |
| 2,473,965 | Morrison et al. | June 21, 1949 |

FOREIGN PATENTS

| | | |
|---|---|---|
| 579,100 | Great Britain | July 23, 1946 |